United States Patent
Burchette

[11] 3,868,782
[45] Mar. 4, 1975

[54] TEST SCORING DEVICE
[76] Inventor: Joseph F. Burchette, P.O. Box 56, Jenks, Okla. 74037
[22] Filed: July 5, 1973
[21] Appl. No.: 376,612

[52] U.S. Cl. .................................. 35/48 R, 35/75
[51] Int. Cl. ............................................ G09b 1/06
[58] Field of Search ............ 35/9 R, 48 R, 48 B, 75, 35/31 B, 31 E

[56] References Cited
UNITED STATES PATENTS
589,180   8/1897   Lamb .................................... 35/75
2,357,744   9/1944   Kennerly ............................ 35/48 R Primary Examiner—John H. Wolff
Attorney, Agent, or Firm—William S. Dorman

[57] ABSTRACT

A test scoring device for use in connection with an answer sheet for a multiple-choice type examination where the answer sheet is divided into a plurality of vertically spaced horizontal rows, each row containing a plurality of horizontally spaced blocks, letters, or numbers which the examinee can cross out or fill in depending upon the answer selected for the given question; the device includes a flat rectangular board adapted to be disposed over the answer sheet and having a plurality of vertically spaced and horizontally extending openings which are disposed over the rows on the answer sheet. Each opening on the board includes a plurality of rectangular slide members which are slidably disposed in the opening for movement back and forth. By manipulating the position of the slide members, the examiner can provide a restricted viewing area for each row over the position of the correct answer. The test scoring device also includes a cover member for retaining the slides in the openings on the board.

2 Claims, 11 Drawing Figures

Answer Sheet

| | A | B | C | D | E |
|---|---|---|---|---|---|
| 1 | A | B | ☒ | D | E |
| 2 | ☒ | B | C | D | E |
| 3 | A | B | C | ☒ | E |
| 4 | A | B | C | ☒ | E |
| 5 | A | ☒ | C | D | E |
| 6 | A | B | ☒ | D | E |
| 7 | A | B | C | D | ☒ |
| 8 | ☒ | B | C | D | E |
| 9 | A | B | C | D | ☒ |
| 10 | A | B | ☒ | D | E |

TEST SCORING DEVICE

BACKGROUND OF THE INVENTION

1. Field of the Invention

The present invention relates to an examination or test scoring device and, more particularly, to a simplified, manually operable test scoring board.

2. Description of the Prior Art

There are many devices, machines, and systems known in the prior art for aiding the examiner in grading test or examination papers. Representative patents are listed as follows:

| Kinnaird | 1,867,511 |
|---|---|
| Finkenbinder | 1,883,775 |
| Kennerly | 2,357,744 |
| Poritz | 2,503,130 |
| Arrowsmith et al. | 2,835,989 |
| Willey | 2,936,532 |
| Durham | 3,054,196 |
| Riccio | 3,153,863 |
| Lippman | 3,287,827 |
| Mair | 3,289,320 |

None of the prior art patents referred to above, however, show the arrangement of the present invention involving the horizontally slidable members which are capable of exposing one space at a time over the answer rows on an answer sheet for a multiple-choice type examination.

SUMMAARY OF THE INVENTION

The present invention involves a test scoring device comprising a flat rectangular board adapted to be disposed over the answer sheet for a multiple-choice type examination. The answer sheet is typically divided into a plurality of vertically spaced horizontal rows with each row containing a number of horizontally spaced blocks letters or numbers which correspond with the number of answer choices for the particular question corresponding to that row, such that the student or examinee can place a mark or black out the particular space which he feels corresponds to the correct answer. The board which is adapted to be disposed over the answer sheet has a plurality of vertically spaced and horizontally extending openings which have a vertical spacing equal to the vertical spacing of the rows on the answer sheet and which extend horizontally for distance at least equal to the markable portion of the row on the answer sheet. Each opening on the board includes a plurality of rectangular slide members which are disposed for horizontal sliding movement back and forth. The examiner will preset the position of the slide members in each row, by moving them back and forth, so that a viewing area is provided over the position of the correct answer only. Thus, when the scoring device is placed over the answer sheet, the examiner can readily see whether or not a correct answer appears in the viewing area for each row. if no mark or blackening appears beneath a viewing area for a given row, the examiner will score this as an incorrect answer. The device of the present invention also includes a cover member which is disposed over the board to retain the slide members in the openings on the board. Each slide member has a short vertical tab projecting outwardly through the slots in the cover member to permit individual manipulation of the rectangular slide members.

BRIEF DESCRIPTION OF THE DRAWINGS

FIG. 1 is a plan view of an answer sheet for multiple-choice type examination wherein a mark is placed on each row to indicate the examiner's selection of his answer for a given question;

FIG. 11 is a plan view of a modified form of the test scoring device of the present invention superimposed over the answer sheet of FIG. 1.

DESCRIPTION OF THE PREFERRED EMBODIMENTS

Figure 3:
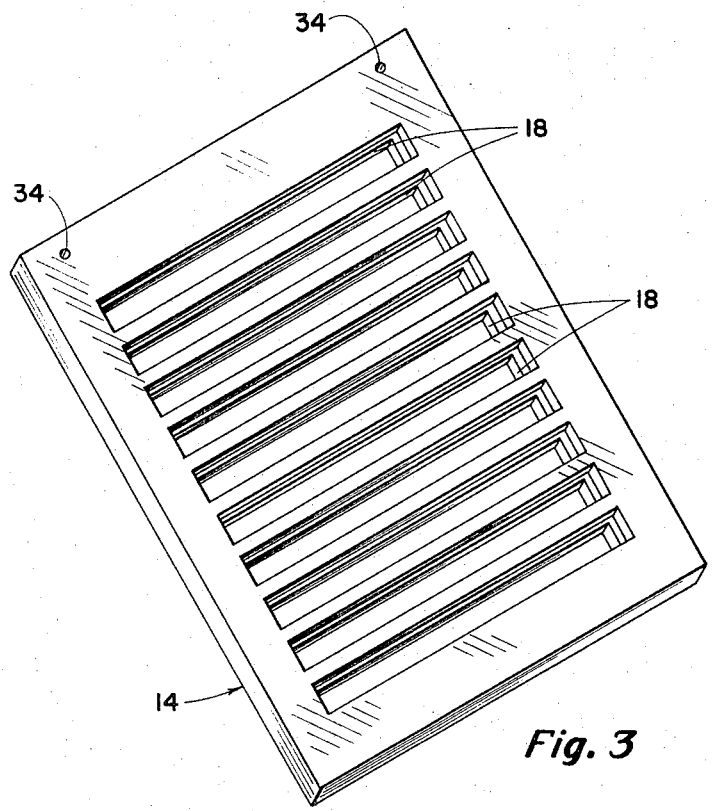
FIG. 3 is a perspective view of the rectangular board which forms the lower and main part of the scoring device of the present invention.

Referring to the drawings in detail, FIG. 1 shows an answer sheet 10 designed for use in conjunction with a typical multiple-choice type examination. Although the answer sheet of FIG. 1 is shown as separate, it could be integrally attached to the question sheet (not shown) in which case the test scoring device of the present invention, later to be described, would be placed only over the answer sheet portion. At any event, the answer sheet shows ten horizontal rows with five blocks in each row, each block being separately lettered to correspond with the multiple-choice selections of answer which would be listed on the examination sheet itself. As shown, the examinee has marked out answer "C" for Question No. 1. For the purposes of the following explanation, it will be assumed that all answers on the answer sheet 10 are correct except for the answer to Question No. 3. The correct answer is "C" whereas the examinee had crossed out "D".

Figure 2:
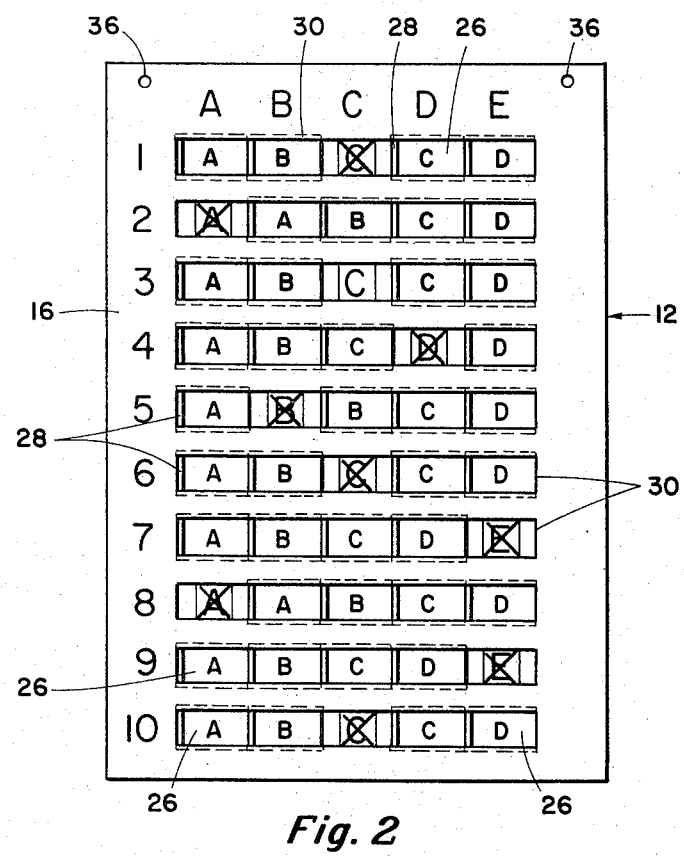
FIG. 2 is a plan view of the test scoring device of the present invention superimposed over the answer sheet of FIG. 1.

Referring now to FIG. 2, there is shown a test scoring device 12 which has been superimposed over the answer sheet of FIG. 1. The various slide members, later to be described, have been adjusted by the examiner so that a viewing area is presented over the location of the correct answer for each question. Thus, in FIG. 2, a correct answer appears for every question except for Question No. 3; there the correct answer "C" is shown as not marked out. The examiner would grade this answer sheet at 90 percent based upon 100 percent for a perfect score.

Referring now to FIGS. 3 through 10, the scoring device 12 comprises a lower flat rectangular board 14 and an upper rectangular cover member 16. The rectangular board has a plurality of vertically spaced and horizontally extending openings 18. These openings 18 are spaced apart vertically the same distance as the rows on the answer sheet 10. Also, these openings 18 extend horizontally to cover at least the portion of each row on the answer sheet occupied by the various squares which are to be crossed out or blacked in. In this regard, each row on the answer sheet can be considered as subdivided into a number of horizontally aligned spaces equal in number to the answer choices for the question corresponding to that row. Thus, whether the spaces include blocks as shown in FIG. 1 or, more particularly, blocks with individual letters therein, is not material. The blocks can appear by themselves, the letters can appear by themselves, or numbers can be substituted in lieu of the letters; also, spaced triangles or circles could be employed; whether the examinee is instructed to cross out the letter, place a check in a box or circle, or to block out the circle, box, letter, etc., is not material. The device of the present invention would work under of the above indicated circumstances.

Figure 10:
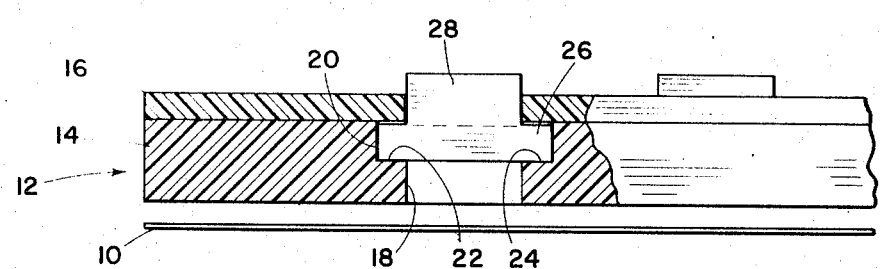
FIG. 10 is an enlarged fragmentary view of the left-hand portion of FIG. 9.

Each opening 18 is enlarged at 20 so as to provide flat shelves 22 and 24 along the longitudinal side edges of the enlarged portion 20. The upper end 20 of each opening 18 has received therein a plurality of rectangular slide members 26, the lower side edges of which rest against the shelves 22 and 24 as best shown in FIG. 10. Each rectangular slide member is provided with a vertically upwardly projecting tab 28 for a purpose which will hereinafter appear.

Figure 5:
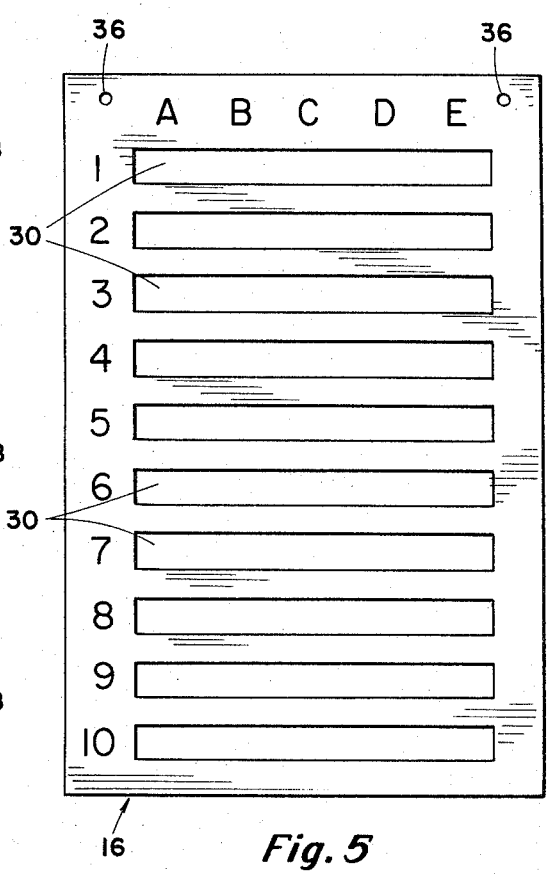
FIG. 5 is a plan view of the cover member which forms the upper portion of the test scoring device of the present invention.
Figure 6:
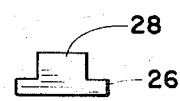
FIG. 6 is a left-hand side view of one of the horizontal slide members adapted to be received in the openings of the board.
Figure 7:
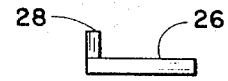
FIG. 7 is a front view of the slide member shown in FIG. 6.
Figure 8:
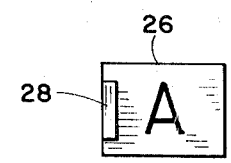
FIG. 8 is a plan view of the horizontal slide member shown in FIGS. 6 and 7.
Figure 9:
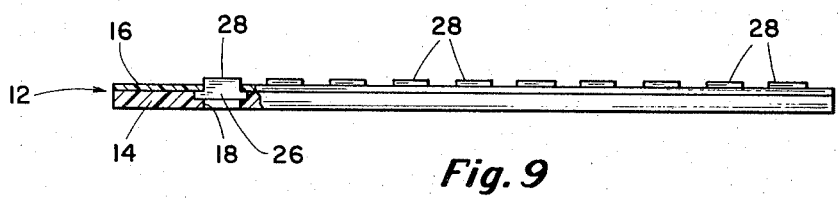
FIG. 9 is a left-hand side view, with a portion broken away, of the test scoring device shown in FIG 2.

As best shown in FIG. 5, the cover member 16 is provided with a plurality of vertically spaced and horizontally extending slots 30 which are slightly narrower than the width of the rectangular slide members 26 and which are preferably the same width as the lower portions of the openings 18. These slots are designed to fit over the openings 18 to retain the rectangular slide members 26 therein as best shown in FIG. 10. The tabs 28 preferably extend across the full width of the slots 30.

Figure 4:
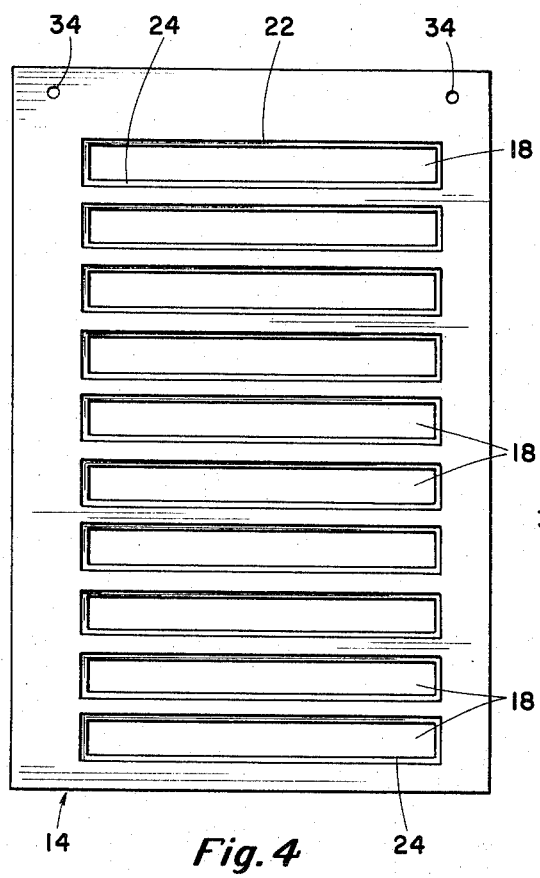
FIG. 4 is a plan view of the board shown in FIG. 3.

As shown in FIG. 2, the cover member 16 is superimposed over the board 14 such that the details of the latter are not visible although this board 14 is shown in FIGS. 3 and 4. The number of rectangular slide members 26 disposed in each opening 18 of the device 12 shown in FIG. 2 is four, or one less than the number of available choices in the subdivided portion of the row on the answer sheet below the opening 18. Prior to resetting the device 12 for the requirements of a given answer sheet, all of the slide members 26 would be moved to the left, thus exposing all of the "E" viewing areas in the various rows. If, now, for example, it was determined that "C" was the correct answer to Question No. 1, the examiner would engage the tab 28 on the "C" horizontal slide member 26 and urge the same towards the right, the latter in turn also urging the "D" horizontal slide member to the right into the "E" position, thereby exposing the "C" area. Similarly, for Question No. 2, if it was determined that "A" was the correct answer, the examiner would engage the tab 28 of the "A" slide member 26 and push all four slide members towards the right to expose the "A" viewing area. Thus, with regard to FIGS. 2, 3 and 4, the openings 18 are substantially equal in length to the length of the subdivided area on the answer sheet 10. Also, the slots 30 in the cover sheet are substantially equal to the length of the subdivided area on the answer sheet.

Turning now to a consideration of FIG. 11, however, there is shown a modified scoring device 12' which has five slidable members 26 in each row 18. Thus, with all the slide members 26 occupying their left-hand positions, all of the individual viewing areas would be obscured. However, if any one of the various slide members were urged towards the right, pushing along with it any other slide member occupying a position to the right of the engaged member, then one of the viewing areas would be exposed and the "E" rectangular slide member would be urged towards the right into a recess presently to be described. For the purpose of the embodiment shown in FIG. 11, the openings 18 would extend horizontally for a disance equal to the subdivided area on the answer sheet plus the length of one of the horizontal members 26. However, the cover member 16' preferably has openings 30 which are of the same size as those in the cover member 16 utilized in the embodiment of FIG. 2. Thus, each "E" rectangular slide member 26 occupies the recess represented by the right-hand end of the openings 18 below the cover member 16'. The number of slide members in the embodiment shown in FIG. 11 is, therefore, equal to the number of choices available in the subdivided row on the answer sheet.

Generally speaking, the size of the rectangular scoring device is the same as the external shape of the answer sheet 10 so that no difficulty is encountered in superimposing the scoring device 12 on the answer sheet 10. However, there may be instances where the answer sheet is of a slightly different size than the configuration of the scoring device or where the answer sheet is attached to an examination paper. In such cases, alignment can be effected by means of a pair of small holes 32 in the upper corners of the answer sheet, a pair of small holes 34 in the upper corners of the board 14 and a pair of holes 36 in the upper corners of the cover member 16. If one were to provide a support board (not shown) haaving thereon a pair of upright impaling pins spaced apart a distance equal to the distance between holes 32, for example, this supporting board could be used to align the answer sheet with the scoring device by first placing the answer sheet over the supporting board with the impaling pins passing through the holes 32. Thereafter, the scoring device 12 can be placed on the supporting board over the answer sheet by passing the impaling pins through the holes 34 and 36.

Whereas the present invention has been described in particular relation to the drawings attached hereto, it should be understood that other and further modifications, apart from those shown or suggested herein, may be made within the spirit and scope of this invention.

What is claimed is:

1. For use in combination with an answer sheet for a multiple choice type examination wherein the answer sheet is divided into a plurality of vertically spaced horizontal rows, each row corresponding to a question on the examination, each row having at least a portion thereof subdivided into a number of horizontally aligned spaces equal to the number of answer choices for the question corresponding to that row, whereby the examinee can place a mark in one space on a given row, whereby the examinee can place a mark in one space on a given row to indicate his answer choice to the question corresponding to that given row; an examination scoring device comprising: a flat rectangular board adapted to be disposed over said answer sheet and having a plurality of vertically spaced and horizontally extending openings, said openings haaving a vertical spacing equal to the vertical spacing of said rows on said answer sheet and extending horizontally for a distance at least as long as the subdivided portions of said rows, each opening having a lower portion of a predetermined vertical width and superimposed over the vertical dimension of the underlying row on the answer sheet, said predetermined vertical width being sufficiently great to expose a major portion of the vertical dimension of the underlying row on the answer sheet, each opening also having an upper portion whose width is greater than the lower portion, the upper portion forming flat shoulders on opposite sides of the lower portion of said opening, a plurality of non-transparent rectangular slide members having a vertical width equal to the width of the upper portion of said opening and slidably disposed in each opening and resting on said shoulders for horizontal sliding movement backand forth in each opening, a cover member disposed on said board for retaining said slide members in said openings, said cover member having a plurality of vertically spaced and horizontally extending slots narower than the vertical width of said slide members and located over said openings, each of said slide members having a tab thereon projecting outwardly through its associated slot to permit horizontal movement of each slide member in its associated opening, the number of slide members in a given opening being such in relation to the horizontal length of said opening that all of the spaces in a row beneath sid opening will be visually obscured except for a predetermined space which represents the corrct answer for that row, so that, when said board is disposed over said answer sheet, the examiner can compare the answers selected by the examinee with the correct answers and determine the score, the horizontal length of each opening of said board being equal to the length of the subdivided portion of the underlying row on said answer sheet plus the length of one slide member, and the number of slide members in each opening being equal to the number of spaces in the underlying row.

2. The improvement according to claim 1 wherein the length of each slot is equal to the length of the subdivided portion of the underlying row.

* * * * *